US012192093B2

(12) United States Patent
Hegde et al.

(10) Patent No.: US 12,192,093 B2
(45) Date of Patent: Jan. 7, 2025

(54) DISTRIBUTED FLOODING TECHNIQUE

(71) Applicant: Juniper Networks, Inc., Sunnyvale, CA (US)

(72) Inventors: Shraddha Hegde, Bangalore (IN); Russ White, Louisville, TN (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/346,384

(22) Filed: Jul. 3, 2023

(65) Prior Publication Data
US 2024/0064091 A1 Feb. 22, 2024

Related U.S. Application Data

(63) Continuation of application No. 17/820,423, filed on Aug. 17, 2022, now Pat. No. 11,736,385.

(51) Int. Cl.
*H04L 45/122* (2022.01)
*H04L 45/02* (2022.01)
*H04L 45/12* (2022.01)

(52) U.S. Cl.
CPC ............ *H04L 45/122* (2013.01); *H04L 45/02* (2013.01); *H04L 45/123* (2013.01)

(58) Field of Classification Search
CPC ...... H04L 45/122; H04L 45/02; H04L 45/123
(Continued)

(56) References Cited

U.S. PATENT DOCUMENTS 6,985,959 B1 * 1/2006 Lee .................... H04L 45/00
709/230
7,710,882 B1 * 5/2010 Previdi .................. H04L 45/48
370/254
(Continued)

FOREIGN PATENT DOCUMENTS

WO WO-2011043824 A1 * 4/2011 ............. H04L 45/00
WO 2013008026 A2 1/2013

OTHER PUBLICATIONS

Chen, et al., "Flooding Topology Minimum Degree Algorithm," Network Working Group; Internet Engineering Task Force; Internet-Draft, Jun. 1, 2021, pp. 1-12, Retrieved from the Internet [URL: https://datatracker.ietf.org/doc/html/draft-ietf-lsr-flooding-topo-min-degree-02].

(Continued)

*Primary Examiner* — Anthony Mejia
(74) *Attorney, Agent, or Firm* — Harrity & Harrity, LLP

(57) ABSTRACT

A network device may receive, from a transmission network device, a link state message associated with an origination network device. The network device may determine an order of a set of one-hop neighbor network devices from the transmission network device. The network device may determine, based on the link state message and the order of the set of one-hop neighbor network devices, whether the network device is to send a copy of the link state message to at least one one-hop neighbor network device of the network device. The network device may send, or refraining from sending, by the network device and based on determining whether the network device is to send the copy of the link state message to the at least one one-hop neighbor network device of the network device, the link state message to the at least one one-hop neighbor network device of the network device.

20 Claims, 8 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 7,756,017 | B2* | 7/2010 | Goyal | H04L 45/03 709/239 |
| 8,149,690 | B1* | 4/2012 | Kakkar | H04L 45/00 370/219 |
| 10,038,623 | B2* | 7/2018 | White | H04L 45/02 |
| 2001/0033548 | A1* | 10/2001 | Saleh | H04J 14/0295 370/389 |
| 2003/0123457 | A1* | 7/2003 | Koppol | H04L 45/04 370/392 |
| 2005/0041676 | A1* | 2/2005 | Weinstein | H04L 45/48 370/401 |
| 2005/0078656 | A1* | 4/2005 | Bryant | H04L 45/02 370/351 |
| 2005/0111349 | A1* | 5/2005 | Vasseur | H04L 45/48 370/216 |
| 2006/0072461 | A1* | 4/2006 | Luong | H04L 45/32 370/254 |
| 2011/0085472 | A1* | 4/2011 | Somasundaram | H04L 45/02 370/254 |
| 2012/0075988 | A1* | 3/2012 | Lu | H04L 45/48 370/218 |
| 2013/0121156 | A1* | 5/2013 | Rege | H04L 45/484 370/238 |
| 2014/0146825 | A1* | 5/2014 | Ashwood-Smith | H04L 45/484 370/401 |
| 2014/0293805 | A1* | 10/2014 | Khaldoun | H04L 12/10 370/252 |
| 2015/0016242 | A1* | 1/2015 | Ernstrom | H04L 45/122 370/218 |
| 2015/0092609 | A1* | 4/2015 | Shah | H04L 45/48 370/256 |
| 2019/0081884 | A1* | 3/2019 | Spohn | H04L 45/124 |
| 2020/0120408 | A1 | 4/2020 | Boyd et al. | |
| 2020/0220803 | A1* | 7/2020 | Zheng | H04L 41/082 |
| 2020/0394249 | A1* | 12/2020 | Meunier | G06F 17/10 |
| 2021/0029017 | A1 | 1/2021 | Chen et al. | |
| 2022/0131808 | A1* | 4/2022 | Xie | H04L 45/18 |

OTHER PUBLICATIONS

Co-pending U.S. Appl. No. 17/820,423, inventors Hegde; Shraddha et al., filed on Aug. 17, 2022.

Li, et al., "Dynamic Flooding on Dense Graphs," Internet Engineering Task Force; Internet-Draft, Jun. 9, 2021, pp. 1-47, Retrieved from the Internet [URL: https://datatracker.ietf.org/doc/html/draft-ietf-lsr-dynamic-flooding-09].

Smit, et al., "IS-IS Sparse Link-State Flooding," LSR Working Group; Internet Engineering Task Force, Oct. 22, 2018, pp. 1-12. Retrieved from the Internet [URL: https://datatracker.ietf.org/doc/html/draft-hsmit-lsr-isis-dnfm-00].

White, et al., "IS-IS Optimal Distributed Flooding for Dense Topologies," Network Working Group; Internet Engineering Task Force; Internet-Draft, Jul. 27, 2020, pp. 1-12, Retrieved from the Internet [URL: https://datatracker.ietf.org/doc/html/draft-white-distoptflood-04].

White, et al.,, IS-IS Optimal Distributed Flooding for Dense Topologies, Network Working Group; Internet Engineering Task Force; Internet-Draft, Nov. 29, 2020, pp. 1-12, Retrieved from the Internet [URL: https://datatracker.ietf.org/doc/html/draft-White-lsr-distoptflood-00].

* cited by examiner

DISTRIBUTED FLOODING TECHNIQUE

RELATED APPLICATION

This application is a continuation of U.S. patent application Ser. No. 17/820,423, filed Aug. 17, 2022, which is incorporated herein by reference in its entirety.

BACKGROUND

Link state routing protocols, such as open shortest path first (OSPF) protocol and intermediate system to intermediate system (IS-IS) protocol, are often used in packet switching networks. Each network device (sometimes referred to as a node) of a network associated with a link state protocol generates, stores, and maintains a topology of the network (e.g., that indicates how the network device and other network devices of the network are connected).

SUMMARY

In some implementations, a network device includes one or more memories, and one or more processors to: receive, from a transmission network device, a link state message associated with an origination network device; determine a shortest-path spanning tree (SPT) from the origination network device to the network device; determine a set of two-hop neighbor network devices from the transmission network device; determine a set of one-hop neighbor network devices from the transmission network device; update, based on the SPT, the set of two-hop neighbor network devices; determine, using an ordering technique, an order of the set of one-hop neighbor network devices; determine, based on the link state message, the set of two-hop neighbor network devices, and the order of the set of one-hop neighbor network devices, whether the network device is to send a copy of the link state message to at least one one-hop neighbor network device of the network device; and send, or refrain from sending, based on determining whether the network device is to send the copy of the link state message to the at least one one-hop neighbor network device of the network device, the copy of the link state message to the at least one one-hop neighbor network device of the network device.

In some implementations, a non-transitory computer-readable medium storing a set of instructions includes one or more instructions that, when executed by one or more processors of a network device, cause the network device to: receive, from a transmission network device, a link state message associated with an origination network device; determine a set of two-hop neighbor network devices from the transmission network device; determine an order of a set of one-hop neighbor network devices from the transmission network device; determine, based on the link state message, the set of two-hop neighbor network devices, and the order of the set of one-hop neighbor network devices, whether the network device is to send a copy of the link state message to at least one one-hop neighbor network device of the network device; and send, or refrain from sending, based on determining whether the network device is to send the copy of the link state message to the at least one one-hop neighbor network device of the network device, the link state message to the at least one one-hop neighbor network device of the network device.

In some implementations, a method includes receiving, by a network device and from a transmission network device, a link state message associated with an origination network device; determining, by the network device, an order of a set of one-hop neighbor network devices from the transmission network device; determining, by the network device and based on the link state message and the order of the set of one-hop neighbor network devices, whether the network device is to send a copy of the link state message to at least one one-hop neighbor network device of the network device; and sending, or refraining from sending, by the network device and based on determining whether the network device is to send the copy of the link state message to the at least one one-hop neighbor network device of the network device, the link state message to the at least one one-hop neighbor network device of the network device.

DETAILED DESCRIPTION

Figure 1A:
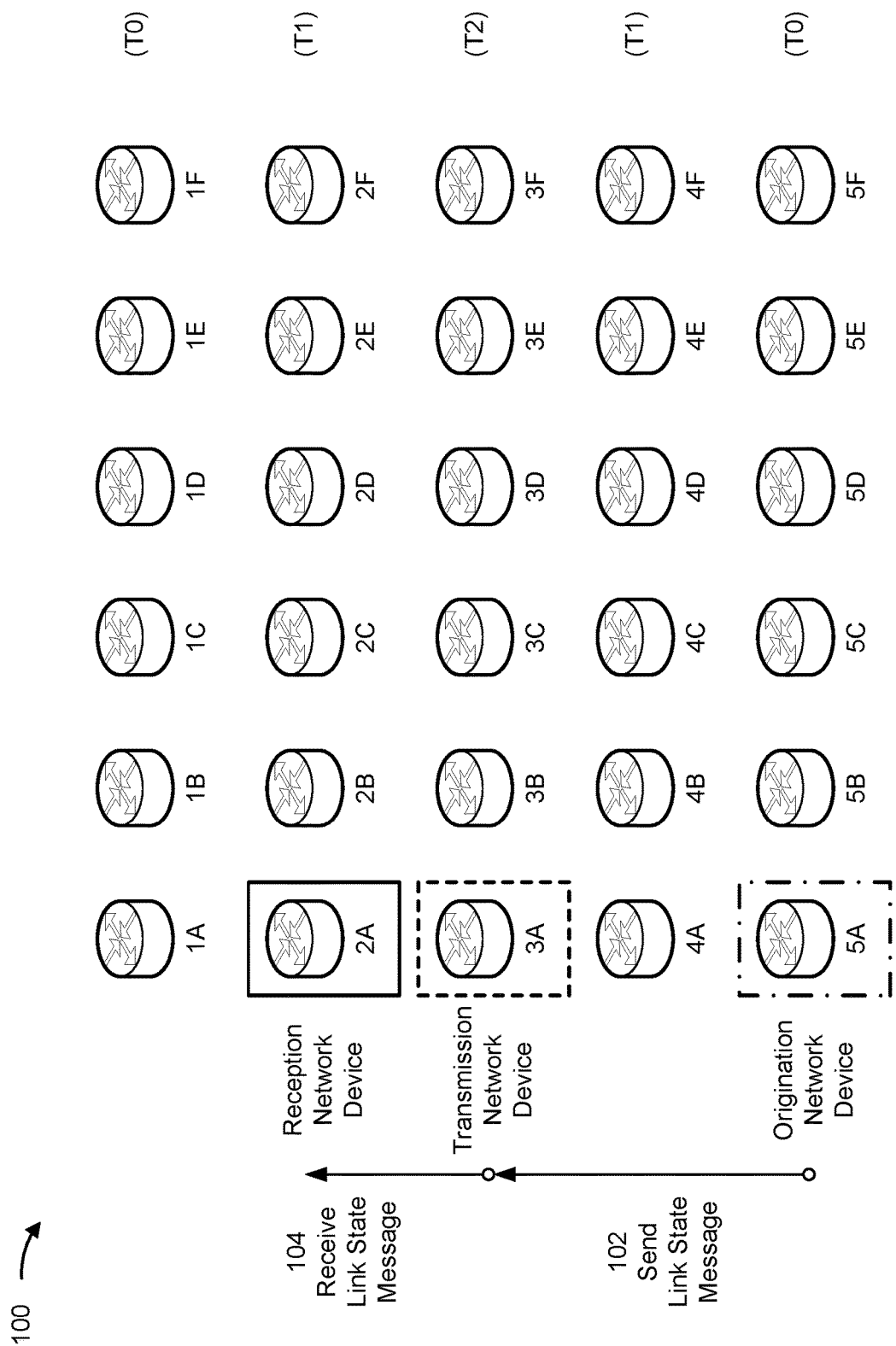
FIGS. 1A-1D are diagrams of one or more example implementations described herein.

The following detailed description of example implementations refers to the accompanying drawings. The same reference numbers in different drawings may identify the same or similar elements.

Conventional flooding techniques, that are associated with link state routing protocols, allow network devices of a network to send (also referred to as "flood") link state messages to respective neighbor network devices of the network devices. When a topology of the network is dense (e.g., each network device is connected to multiple other network devices in the network, such as in a Clos topology or a butterfly topology), each network device may receive multiple copies of the same link state message. Superfluous sending and receiving of messages between network devices is often referred to as "overflooding." This results in slower convergence times (e.g., for the network devices of the network to each update a topology of the network) and high utilization of computing resources (e.g., processing resources, memory resources, communication resources, and/or power resources, among other examples) by the network devices to send, receive, process, and/or copy redundant messages.

Some implementations described herein provide a distributed flooding technique, where a network device (also referred to as a reception network device) receives a link state message from a transmission network device (e.g., that originated or that reflooded the link state message). One or more other network devices (e.g., other reception network devices) may also receive the link state message (e.g., as part of the transmission network device flooding the link state message to its one-hop neighbor network devices). Accordingly, each reception network device may determine whether to reflood the link state message (e.g., whether to send a copy of the link state message to at least one one-hop neighbor network device of the reception network device), as described below.

A reception network device (e.g., one of the reception network devices that received the link state message from the transmission network device) may determine a set of two-hop neighbor network devices from the transmission network device and a set of one-hop neighbor network devices from the transmission network device (e.g., from the point of view of the transmission network device). The reception network device may determine a shortest-path spanning tree (SPT) from the origination network device to the reception network device, and may update the set of two-hop neighbor network devices and/or the set of one-hop neighbor network devices to not include network devices included in the SPT (e.g., to remove non-relevant network devices from the sets). The reception network device then may determine an order of the set of one-hop neighbor network devices (e.g., a sorted sequence of the set of one-hop neighbor network devices, such as based on identifiers of the set of one-hop neighbor network devices), and may determine a particular position (e.g., a "start" position) in the order of the set of one-hop neighbor network devices (e.g., based on particular information included in the link state message).

In some implementations, the reception network device may determine that the particular position in the order of the set of one-hop neighbor network devices is associated with the reception network device (e.g., may determine that the particular position matches the position of the reception network device in the order of the set of one-hop neighbor network devices), and therefore may determine that the reception network device is to reflood the link state message.

In some implementations, the reception network device may determine that the particular position in the order of the set of one-hop neighbor network devices is not associated with the reception network device (e.g., may determine that the particular position does not match the position of the reception network device in the order of the set of one-hop neighbor network device). Accordingly, the reception network device may identify one or more other network devices, of the set of one-hop neighbor network devices, that are positioned before the reception network device in the order of the set of one-hop neighbor network devices. The reception network device may update (e.g., sequentially update) the set of two-hop neighbor network devices by removing one or more network devices that are one-hop neighbor network devices of the one or more other network devices of the set of one-hop neighbor network devices from the set of two-hop neighbor network devices.

The reception network device may determine that the set of two-hop neighbor network devices is not empty (e.g., at least one network device is still included in the set of two-hop neighbor network devices after updating the set of two-hop neighbor network devices, as described above), and may thereby determine that the network device is to send the copy of the link state message (e.g., is to reflood the link state message because the one or more other network devices of the set of one-hop neighbor network devices, identified by the reception network device, are not connected to the network devices that are still included in the set of two-hop neighbor network devices, and therefore the reception network device should reflood the link message to attempt to reach at least one of the network devices still included in the set of two-hop neighbor network devices). Alternatively, the reception network device may determine that the set of two-hop neighbor network devices is empty (e.g., no network device is included in the set of two-hop neighbor network devices after updating the set of two-hop neighbor network devices, as described above), and may thereby determine that the network device is to not send the copy of the link state message (e.g., is to not reflood the link state message, because the one or more other network devices of the set of one-hop neighbor network devices, identified by the reception network device, are connected to all the network devices that were included in the set of two-hop neighbor network devices and are capable of reflooding the link state message to those network devices). The reception network device therefore may send, or refrain from sending, the copy of the link state message to at least one one-hop neighbor network device of the network device.

Each of the reception network devices performs the same processing steps described above. Accordingly, each of the reception network devices may determine the same order of set of one-hop neighbor network devices and the same particular position in the order of the set of one-hop neighbor network devices, and therefore each reception network device may determine, in a consistent manner across the reception network devices, whether to reflood, or refrain from reflooding, the link state message. This increases a likelihood that the link state message is reflooded by the reception network devices to a network device (e.g., a two-hop neighbor network device of the transmission network device) that has not yet received the link state message, and decreases a likelihood that the link state message is reflooded by the reception network devices to a network device (e.g., a two-hop neighbor network device of the transmission network device) that has already received the link state message. In this way, link state messages are generally reflooded "forward" in a network, and generally not flooded "backward" in the network, which reduces a likelihood of any one network device receiving multiple link state messages. This reduces an amount of time the network devices of the network need to converge on a same topology. Further, this conserves computing resources (e.g., processing resources, memory resources, communication resources, and/or power resources, among other examples) that would otherwise be consumed to send, receive, process, and/or copy superfluous link state messages using a conventional flooding technique.

FIGS. 1A-1D are diagrams of one or more example implementations 100 described herein. As shown in FIGS. 1A-1D, example implementation(s) 100 may include a plurality of network devices (shown as network devices 1A-1F, 2A-2F, 3A-3F, 4A-4F, and 5A-5F). The network devices are described in more detail below in connection with FIGS. 2-4.

The plurality of network devices may be connected (e.g., within a network) via a topology. The topology may be a "dense" topology (sometimes referred to as a "densely meshed" topology), such as a Clos topology, where network devices associated with a particular "tier" (sometimes referred to as a "stage" or "level") of the topology are connected to multiple other network devices of another tier of the topology.

For example, as shown in FIGS. 1A-1D, the plurality of network devices may be arranged in a spine-and-leaf topology, where a first group of network devices (network devices 1A-1F) is associated with a first T(0) tier, a second group of network devices (network devices 2A-2F) is associated with a first T(1) tier, a third group of network devices (network devices 3A-3F) is associated with a T(2) tier, a fourth group of network devices (network devices 4A-4F) is associated with a second T(1) tier, and a fifth group of network devices (network devices 5A-5F) is associated with a second T(0) tier. The T(0) tier network devices may be connected to, for example, application servers, or other intermediate Top of Rack (ToR) network devices (e.g., that are not part of the topology). The T(1) and T(2) tier network devices may be connected to, for example, only other network devices within the topology.

Accordingly, in some implementations, each network device in the first group of network devices (e.g., of the first T(0) tier) may be connected (e.g., via respective links) to each network device in the second group of network devices (e.g., of the first T(1) tier), and vice versa; each network device in the second group of network devices (e.g., of the first T(1) tier) may be connected to each network device in the third group of network devices (e.g., of the T(2) tier), and vice versa; each network device in the third group of network devices (e.g., of the T(2) tier) may be connected to each network device in the fourth group of network devices (e.g., of the second T(1) tier), and vice versa; and/or each network device in the fourth group of network devices (e.g., of the second T(1) tier) may be connected to each network device in the fifth group of network devices (e.g., of the second T(0) tier), and vice versa. For example, the network device 5A (e.g., of the second T(0) tier) may be connected to each network device of the network devices 4A-4F (e.g., of the second T(1) tier), and the network device 4C (e.g., of the second T(1) tier) may be connected to each of the network devices 5A-5F (e.g., of the second T(0) tier) and to each of the network devices 3A-3F (e.g., of the T(2) tier). To simplify the figures, links between the network devices are not shown in FIGS. 1A-1D.

In some implementations, a network device in a particular group of network devices associated with a tier may be connected to less than all, or none, of the network devices in another group of network devices associated with an adjacent tier. For example, the network device 2A (e.g., of the first T(1) tier) may be connected to each of the network devices 1A-1C (e.g., of the first T(0) tier), but may not be connected to each of the network devices 1D-1F.

In some implementations, an origination network device, of the topology, may detect one or more changes to the topology (e.g., a change to one or more links of the origination network device, a change to reachability of one or more other network devices that are connected to the origination network device, and/or other changes). Accordingly, the origination network device may generate a link state message (e.g., that includes information related to one or more changes to the topology detected by the origination network device). The link state message may be, for example, an OSPF link-state advertisement (LSA), or a similar message. The link state message may include identification information, fragment identification information, and/or other information, which may be represented by one or more bits.

The origination network device may "flood" the link state message. For example, the origination network device may send a copy of the link state message to each neighbor network device directly connected to the origination network device (e.g., each one-hop neighbor network device of the origination network device). One or more other network devices in the topology may therefore receive a link state message and may "reflood," or may refrain from reflooding, copies of the link state message, as described in detail herein.

In a specific example, as shown in FIG. 1A, the network device 5A (e.g., of the second T(0) tier) may be the origination network device. As shown by reference number 102, the origination network device (e.g., the network device 5A) may flood a link state message by respectively sending copies of the link state message to one or more or more neighbor network devices of the origination network device (e.g., the network devices 4A-4B). Accordingly, the link state message (or a copy of the link state message) may be received by a transmission network device (e.g., a network device connected to the origination network device or that is along a path of transmission from the origination network device), such as the network device 3A (of the T(2) tier). The transmission network device may send the link state message (or a copy of the link state message) (e.g., based on the transmission network device reflooding the link state message, as described herein) to a reception network device, such as the network device 2A (e.g., of the first T(1) tier). In this way, as shown by reference number 104, the reception network device (e.g., the network device 2A) may receive, from the transmission network device (e.g., the network device 3A), a link state message that is associated with the origination network device (e.g., that was generated by the network device 5A).

Figure 1B:
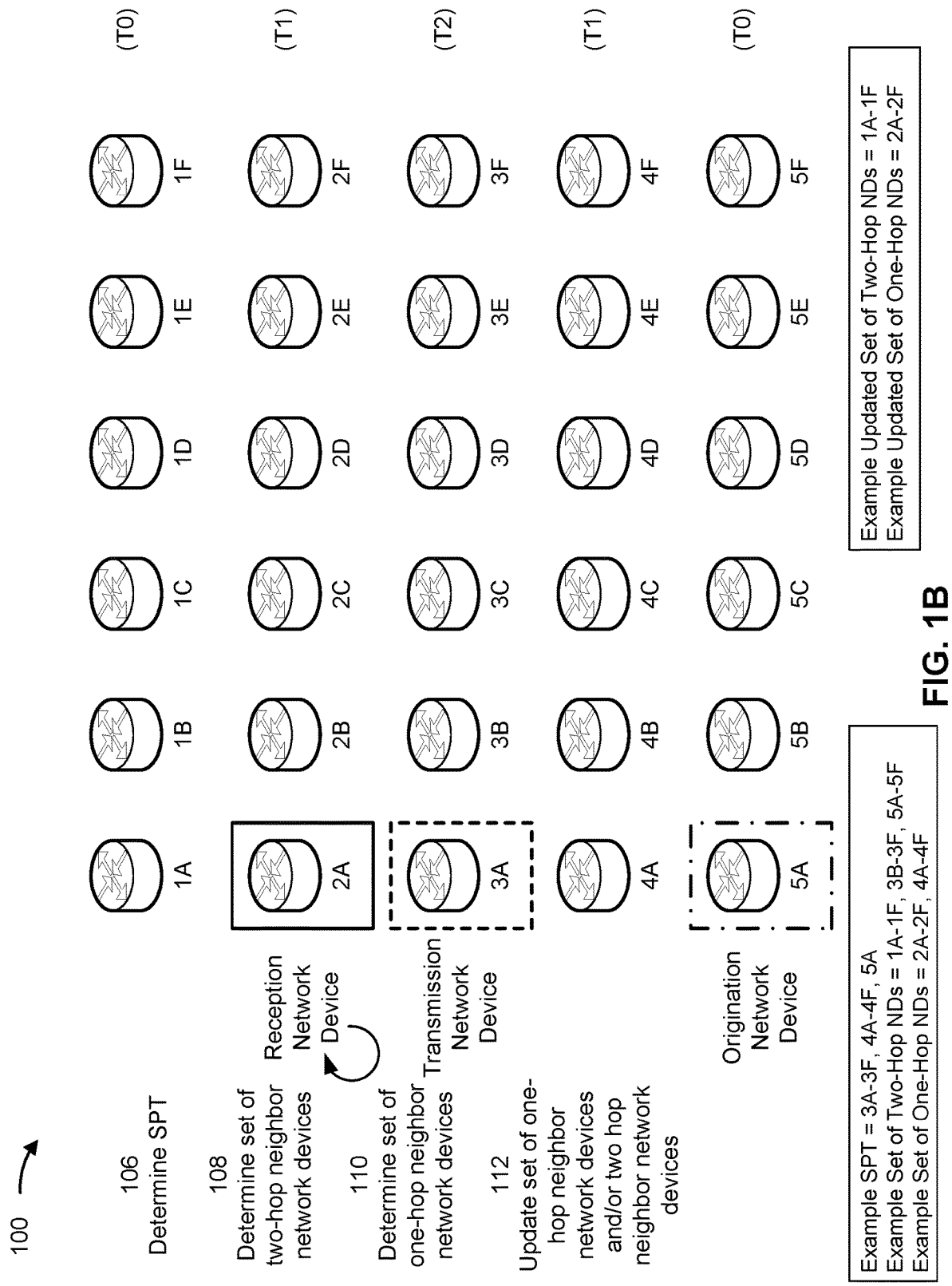

As shown in FIG. 1B, the reception network device may determine information, such as one or more trees (e.g., one or more data trees), one or more sets of network devices, and/or similar information. The reception network device may determine the information based on receiving the link state message (e.g., from the transmission network device). For example, the reception network device may determine the information based on processing the link state message (e.g., to identify the origination network device and/or the transmission network device). Alternatively, the reception network device may determine the information structure independent of receiving the link state message. For example, the reception network device may determine the information prior to receiving the link state message.

As shown by reference number 106, the reception network device may determine an SPT from the origination network device to the reception network device. The SPT may identify one or more network devices that are along a shortest path from the origination network device to the reception network device (not including the reception network device), where link metrics between network devices in the topology are normalized to a same value (e.g., each link has a value of 1). For example, as shown in FIG. 1B, when the reception network device is the network device 2A, the transmission network device is the network device 3A, and the origination network device is the network device 5A, the network device 2A may determine an SPT (e.g., from network device 5A to network device 2A) that includes the network devices 3A-3F, 4A-4F, and 5A. In some implementations, the reception network device may truncate the SPT to only include network devices along the shortest path that are at most two-hops from the transmission network device. For example, the SPT may include the transmission network device and one-hop neighbor network devices and two-hop neighbor network devices of the transmission network device that are along the shortest path. While some implementations are directed to using an SPT, the network device may determine and use a direct acyclic graph (DAG), or a similar structure, instead of an SPT. The DAG may identify one or more network devices that are along a shortest path from the origination network device to the reception network device (not including the reception network device).

As shown by reference number 108, the reception network device may determine a set of two-hop neighbor network devices from the transmission network device (e.g., that includes one or more network devices that are two hops from the transmission network device). For example, as shown in FIG. 1B, when the reception network device is the network device 2A, the transmission network device is the network device 3A, and the origination network device is the network device 5A, the network device 2A may determine a set of two-hop neighbor network devices (e.g., of the network device 3A) that includes network devices 1A-1F, 3B-3F, and 5A-5F.

As shown by reference number 110, the reception network device may determine a set of one-hop neighbor network devices from the transmission network device (e.g., that includes one or more network devices that are one hop from the transmission network device). For example, as shown in FIG. 1B, when the reception network device is the network device 2A, the transmission network device is the network device 3A, and the origination network device is the network device 5A, the network device 2A may determine a set of one-hop neighbor network devices (e.g., of the network device 3A) that includes network devices 2A-2F, and 4A-4F.

As shown by reference number 112, the reception network device may update the set of two-hop neighbor network devices and/or the set of one-hop neighbor network devices. In some implementations, the reception network device may update the set of two-hop neighbor network devices and/or the set of one-hop neighbor network devices based on the SPT, such as by removing network devices from each of the sets that are associated with the SPT, removing network devices from each of the sets that are one-hop neighbor network devices of the origination network device, and/or removing other network devices.

For example, the reception network device may identify a particular network device, of the set of two-hop neighbor network devices, that is included in the SPT and/or that is a one-hop neighbor network device of another network device in the SPT, and remove the particular network device from the set of two-hop neighbor network devices. In this way, the reception network device may cause the set of two-hop neighbor network devices to include one or more network devices that are two hops from the network device and that are not associated with the SPT. For example, as shown in FIG. 1B, when the reception network device is the network device 2A, the transmission network device is the network device 3A, and the origination network device is the network device 5A, the network device 2A may update the set of two-hop neighbor network devices (e.g., of the network device 3A) by removing network devices associated with the SPT. Accordingly, the updated set of two-hop neighbor network devices may include, after removing the network devices 3B-3F (e.g., that are included in the SPT) and the network devices 5A-5F (e.g., because each network device of the network devices 5A-5F is a one-hop neighbor network device of the network devices 4A-4F, which are included in the SPT), the network devices 1A-1F.

As another example, the reception network device may identify a particular network device, of the set of one-hop neighbor network devices, that is included in the SPT and/or that is a one-hop neighbor network device of another network device in the SPT, and remove the particular network device from the set of one-hop neighbor network devices. In this way, the reception network device may cause the set of one-hop neighbor network devices to include one or more network devices that are one hop from the network device and that are not associated with the SPT. For example, as shown in FIG. 1B, when the reception network device is the network device 2A, the transmission network device is the network device 3A, and the origination network device is the network device 5A, the network device 2A may update the set of one-hop neighbor network devices (e.g., of the network device 3A) by removing network devices associated with the SPT. Accordingly, the updated set of one-hop neighbor network devices may include the network devices 2A-2F after removing the network devices 4A-4F (e.g., that are included in the SPT).

Figure 1C:
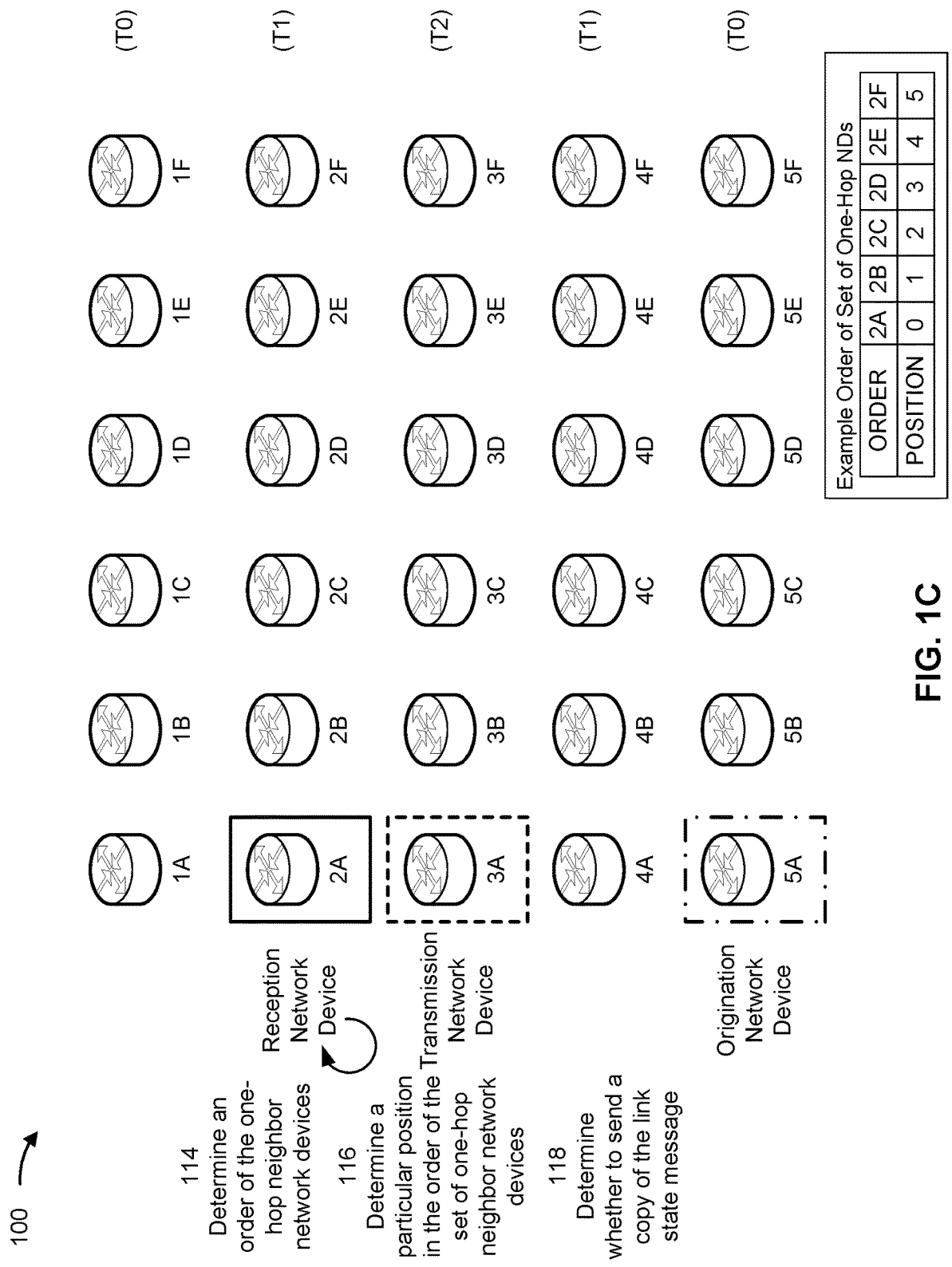

As shown in FIG. 1C, and by reference number 114, the reception network device may determine an order (e.g., a sorted sequence) of the set of one-hop neighbor network devices. In some implementations, the reception network device may identify respective information associated with the set of one-hop neighbor network devices, and may determine, based on the respective information associated with the set of one-hop neighbor network devices, the order of the set of one-hop neighbor network devices. For example, the reception network device may identify respective identifiers (e.g., hardware address identifiers, universally unique identifiers (UUIDs), and/or other identifiers) of the set of one-hop neighbor network devices, and may determine, based on the respective identifiers of the set of one-hop neighbor network devices, the order of the set of one-hop neighbor network devices.

The reception network device may use an ordering technique to determine the order of the set of one-hop neighbor network devices. For example, the network device may process the respective identifiers of the set of one-hop neighbor network devices using an alpha-numeric ordering technique (e.g., an alpha-numeric ordering algorithm) to determine the order of the set of one-hop neighbor network devices. For example, when the reception network device is the network device 2A and the set of one-hop neighbor network devices includes network devices 2A-2F (e.g., after being updated, as described herein in relation to FIG. 1B and reference number 112), the reception network device may identify respective identifiers of the set of one-hop neighbor network devices (e.g., respective identifiers of the network devices 2A-2F) and thereby determine an order of the set of one-hop neighbor network devices (e.g., the example order shown in FIG. 1C). For simplicity, the order is described herein as being the left-to-right order of network devices 2A-2F shown in FIG. 1C (e.g., ordered as the network device 2A at position 0, the network device 2B at position 1, the network device 2C at position 2, the network device 2D at position 3, the network device 2E at position 4, and the network device 2F at position 5), but the reception network device may determine any order of the network devices 2A-2F.

As shown by reference number 116, the reception network device may determine a particular position in the order of the set of one-hop neighbor network devices. The particular position may be a "start" position in the order of the set of one-hop neighbor network devices, at which the reception network device is to analyze the order of the set of one-hop neighbor network devices, as described herein. For example, with reference to the example order of the set of one-hop neighbor network devices shown in FIG. 1C, the reception network device may determine a particular position, such as position 1, which indicates that the reception network device is to start with network device 2B (e.g., that is associated with position 1 in the order of the set of one-hop neighbor network devices).

In some implementations, the reception network device may determine the particular position in the order of the set of one-hop neighbor network devices based on the link state message and/or the order of the set of one-hop neighbor network devices. For example, the reception network device may identify particular information included in the link state message (e.g., identification information, fragment identification information, and/or other information included in the link state message), and may determine a numerical value based on the particular information. The reception network device may process the bits that represent the particular identification information using a numerical operation (e.g., a summing operation, a multiplication operation, a division operation, a modulus operation, and/or another numerical operation), and/or another operation, to determine the numerical value. Accordingly, the reception network device may determine a number of network devices included in the set of one-hop neighbor network devices (e.g., a total number of network devices included in the set of one-hop neighbor network devices), and may determine, based on the numerical value and the number of network devices included in the set of one-hop neighbor network devices, the particular position in the order of the set of one-hop neighbor network devices. For example, the reception network device may process the numerical value and the number of network devices using a numerical operation, such as a modulus operation (e.g., the number value MOD (%) the number of network devices) to determine the particular position in the order of the set of one-hop neighbor network devices.

As a first particular example, when the reception network device is the network device 2A, the reception network device may determine that the particular position in the set of one-hop neighbor network devices is position 0 (e.g., that is associated with the network device 2A in the example order of set of one-hop neighbor network devices shown in FIG. 1C). As a second particular example, when the reception network device is the network device 2A, the reception network device may determine that the particular position in the set of one-hop neighbor network devices is position 4 (e.g., that is associated with the network device 2E in the example order of the set of one-hop neighbor network devices shown in FIG. 1C). The first particular example and the second particular will be further referenced herein.

As shown by reference number 118, the reception network device may determine whether to send a copy of the link state message, such as to at least one one-hop neighbor network device of the reception network device. The reception network device may determine whether to send the copy of the link state message based on the link state message, the set of two-hop neighbor network devices, and/or the order of the set of one-hop neighbor network devices. In some implementations, the reception network device may determine (e.g., based on the link state message, the set of two-hop neighbor network devices, and/or the order of the set of Zone-hop neighbor network devices) that the reception network device is to send the copy of the link state message (e.g., the reception network device is to reflood the link state message), or may determine that the reception network device is to not send the copy of the link state message (e.g., the reception network device is to not reflood the link state message).

With reference to the first particular example described above, when the reception network device is the network device 2A and the particular position (e.g., as determined by the reception network device) in the set of one-hop neighbor network devices is position 0 (e.g., that is associated with the network device 2A in the example order of set of one-hop neighbor network devices shown in FIG. 1C), the reception network device may determine that the particular position in the order of the set of one-hop neighbor network devices is associated with the reception network device (e.g., may determine that the particular position matches the position of the reception network device in the order of the set of one-hop neighbor network devices). Accordingly, the reception network device may determine (e.g., based on determining that the particular position in the order of the set of one-hop neighbor network devices is associated with the reception network device) that the reception network device is to send the copy of the link state message (e.g., to the at least one one-hop neighbor network device of the reception network device). In this way, the reception network device may determine that the reception network device is to reflood the link state message.

With reference to the second particular example described above, when the reception network device is the network device 2A and the particular position (e.g., as determined by the reception network device) in the set of one-hop neighbor network devices is position 4 (e.g., that is associated with the network device 2E in the example order of the set of one-hop neighbor network devices shown in FIG. 1C), the reception network device may determine that the particular position in the order of the set of one-hop neighbor network devices is not associated with the reception network device (e.g., may determine that the particular position does not match the position of the reception network device in the order of the set of one-hop neighbor network devices). Additionally, or alternatively, the reception network device may identify (e.g., based on the particular position in the order of the set of one-hop neighbor network devices) one or more other network devices, of the set of one-hop neighbor network devices, that are positioned before the reception network device in the order of the set of one-hop neighbor network devices. For example, the network device 2A (e.g., the reception network device) may determine that network device 2E (e.g., that has the particular position, position 4, in the order of the set of one-hop neighbor network devices) and the network device 2F (e.g., that has position 5 in the order of the set of one-hop neighbor network devices) are positioned before the network device 2A (e.g., when the order of the set of one-hop neighbor network devices is considered to "wrap around" from a last network device in the order to a first network device in the order).

Accordingly, the reception network device may update the set of two-hop neighbor network devices. For example, the reception network device may update the set of two-hop neighbor network devices by removing one or more network devices that are one-hop neighbor network devices of the one or more other network devices of the set of one-hop neighbor network devices (e.g., as identified the reception network device) from the set of two-hop neighbor network devices. For example, when the network device 2A (e.g., the reception network device) identifies the network device 2E and the network device 2F as positioned before the network device 2A, the network device may remove, from the set of two-hop neighbor network devices, one-hop neighbor network devices of the network device 2E and one-hop neighbor network devices of the network device 2F. Accordingly, when the network devices 2E and 2F are each connected to the network devices 1A-1F in the first T(0) tier, the reception network device may remove the network devices 1A-1F from the set of two-hop neighbor network devices (e.g., that includes the network devices 1A-1F), which causes the set of two-hop neighbor network devices to be empty (e.g., no network device is included in the set of two-hop neighbor network devices). Alternatively, when the network devices 2E and 2F are respectively connected to only the network devices 1E and 1F in the first T(0) tier, the reception network device may remove the network devices 1E-1F from the set of two-hop neighbor network devices (e.g., that includes the network devices 1A-1F), which causes the set of two-hop neighbor network devices to not be empty because the set of two-hop neighbor network devices still includes the network devices 1A-1D.

After updating the set of two-hop neighbor network devices, the network device may determine whether the network device is to send the copy of the link message. For example, the reception network device may determine that the set of two-hop neighbor network devices is not empty (e.g., at least one network device is still included in the set of two-hop neighbor network devices after updating the set of two-hop neighbor network devices, as described above), and may thereby determine that the network device is to send the copy of the link state message (e.g., because the one or more other network devices of the set of one-hop neighbor network devices, identified by the reception network device, are not connected to the network devices that are still included in the set of two-hop neighbor network devices, and therefore the reception network device should reflood the link message to attempt to reach at least one of the network devices still included in the set of two-hop neighbor network devices). Alternatively, the reception network device may determine that the set of two-hop neighbor network devices is empty (e.g., no network device is included in the set of two-hop neighbor network devices after updating the set of two-hop neighbor network devices, as described above), and may thereby determine that the network device is to not send the copy of the link state message (e.g., because the one or more other network devices of the set of one-hop neighbor network devices, identified by the reception network device, are connected to all of the network devices that were included in the set of two-hop neighbor network devices and are therefore capable of reflooding the link state message to the network devices that were included in the set of two-hop neighbor network devices).

Figure 1D:
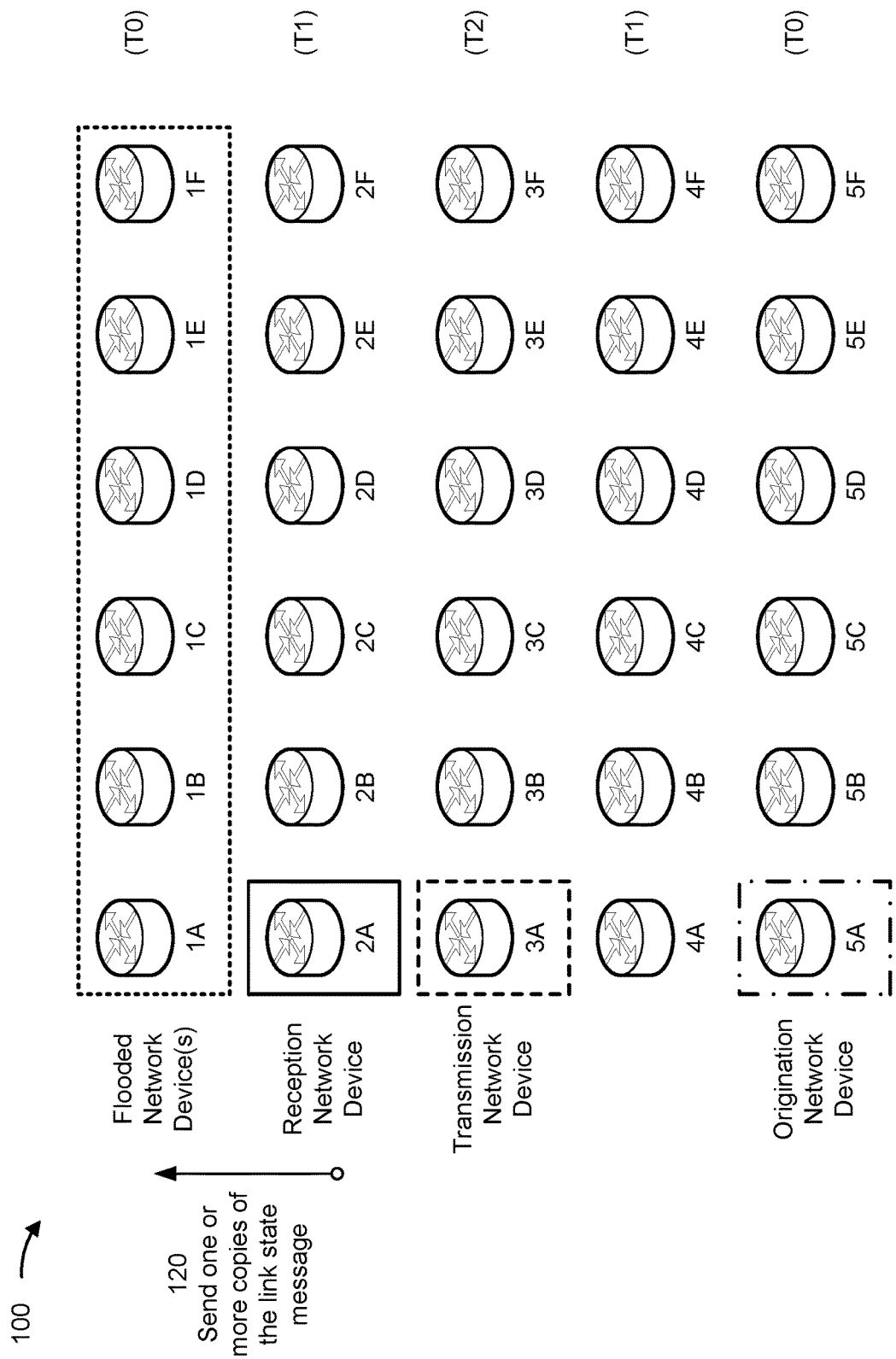

As shown in FIG. 1D, and by reference number 120, the reception network device may send one or more copies of the link state message (e.g., may reflood the link state message). In some implementations, the reception network device may send, based on determining that the reception network device is to send the copy of the link state message (e.g., as described herein in relation to FIG. 1C and reference number 120), a copy of the link state message to at least one-hop neighbor network device of the reception network device. For example, when the reception network device is the network device 2A, the one-hop neighbor network devices of the reception network devices include the network devices 1A-1F and the network devices 3A-3F. Accordingly, the reception network device may send a copy of the link state message to each of the network devices 1A-1F and the network devices 3A-3F. These network devices may be referred to as flooded network devices (e.g., as shown in FIG. 1D). In this way, a likelihood that the link state message is reflooded to a network device that has not yet received the link state message is increased (e.g., as compared to using a conventional flooding technique that overfloods link state messages).

In some implementations, the reception network device may identify one or more one-hop neighbor network devices of the reception network device that are not included in the SPT (e.g., that the reception network device determined, as discussed herein in relation to FIG. 1B and reference number 106) and may send, to each of the one or more one-hop neighbor network devices of the reception network device network device, the copy of the link state message. For example, when the reception network device is the network device 2A, the reception network device may identify the network devices 1A-1F as not included in the SPT (e.g., as shown in FIG. 1B) and may therefore send a copy of the link state message to each of the network devices 1A-1F (and not to the network devices 3A-3F). In this way, a likelihood that the link state message is reflooded to a network device that has already received the link state message is decreased (e.g., as compared to using a conventional flooding technique that overfloods link state messages).

Alternatively, in some implementations, the reception network device may refrain from sending any copy of the link state message (e.g., may refrain from reflooding the link state message). For example, the reception network device may refrain from sending, based on determining that the reception network device is to not send the copy of the link state message (e.g., as described herein in relation to FIG. 1C and reference number 120), a copy of the link state message to at least one-hop neighbor network device of the reception network device. For example, when the reception network device is the network device 2A, the one-hop neighbor network devices of the reception network device include the network devices 1A-1F and the network devices 3A-3F. Accordingly, the reception network device may refrain from sending a copy of the link state message to any of the network devices 1A-1F and the network devices 3A-3F. In this way, a likelihood that the link state message is reflooded to a network device that has already received the link state message is decreased (e.g., as compared to using a conventional flooding technique that overfloods link state messages).

While some implementations described herein are directed to a single reception network device receiving a link state message from a transmitting network device, additional implementations include multiple reception network devices receiving respective copies of the link state message. Accordingly, each of the reception network devices performs the same processing steps described above. In this way, each of the reception network devices determines the same order of set of one-hop neighbor network devices and the same particular position in the order of the set of one-hop neighbor network devices, and therefore each reception network device determines, in a consistent manner across the reception network devices, whether to reflood, or refrain from reflooding, the link state message.

This increases a likelihood that the link state message is reflooded by the reception network devices to a network device (e.g., a two-hop neighbor network device of the transmission network device) that has not yet received the link state message, and decreases a likelihood that the link state message is reflooded by the reception network devices to a network device (e.g., a two-hop neighbor network device of the transmission network device) that has already received the link state message. In this way, link state messages are generally reflooded "forward" in the network, and generally not flooded "backward" in the network, which reduces a likelihood of any one network device receiving multiple link state messages. This reduces an amount of time the network devices of the network need to converge on a same topology. Further, this conserves computing resources (e.g., processing resources, memory resources, communication resources, and/or power resources, among other examples) that would otherwise be consumed to send, receive, process, and/or copy superfluous link state messages using a conventional flooding technique.

As indicated above, FIGS. 1A-1D are provided merely as one or more examples. Other examples may differ from what is described with regard to FIGS. 1A-1D.

Figure 2:
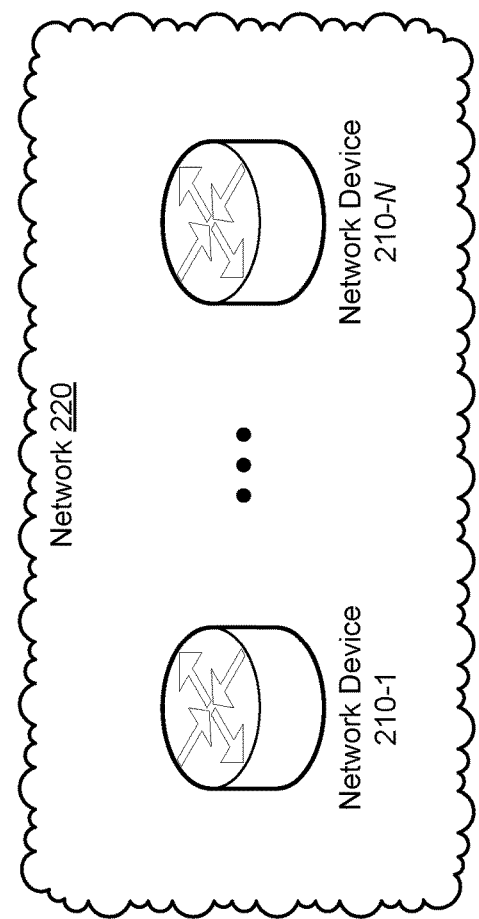
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a plurality of network devices 210 (shown as network devices 210-1 through network device 210-N, where N≥2) and a network 220. Devices of environment 200 may interconnect via wired connections, wireless connections, or a combination of wired and wireless connections.

Network device 210 includes one or more devices capable of receiving, processing, storing, routing, and/or providing traffic (e.g., a packet or other information or metadata) in a manner described herein. For example, network device 210 may include a router, such as a label switching router (LSR), a label edge router (LER), an ingress router, an egress router, a provider router (e.g., a provider edge router or a provider core router), a virtual router, or another type of router. Additionally, or alternatively, network device 210 may include a gateway, a switch, a firewall, a hub, a bridge, a reverse proxy, a server (e.g., a proxy server, a cloud server, or a data center server), a load balancer, and/or a similar device. In some implementations, network device 210 may be a physical device implemented within a housing, such as a chassis. In some implementations, network device 210 may be a virtual device implemented by one or more computer devices of a cloud computing environment or a data center.

Network 220 includes one or more wired and/or wireless networks. For example, network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
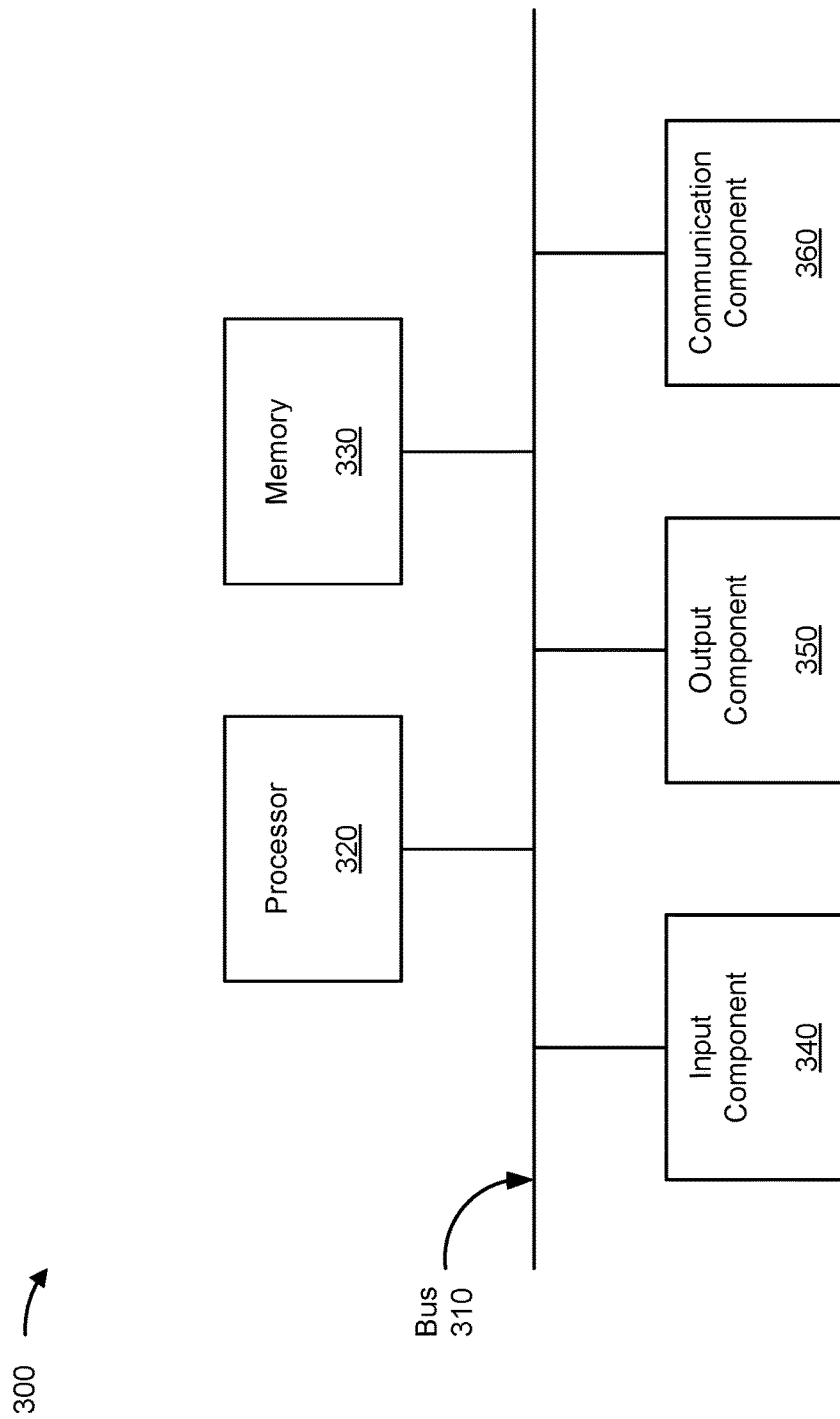
FIG. 3 is a diagram of example components of a device, which may correspond to a network device.

FIG. 3 is a diagram of example components of a device 300, which may correspond to network device 210. In some implementations, network device 210 includes one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
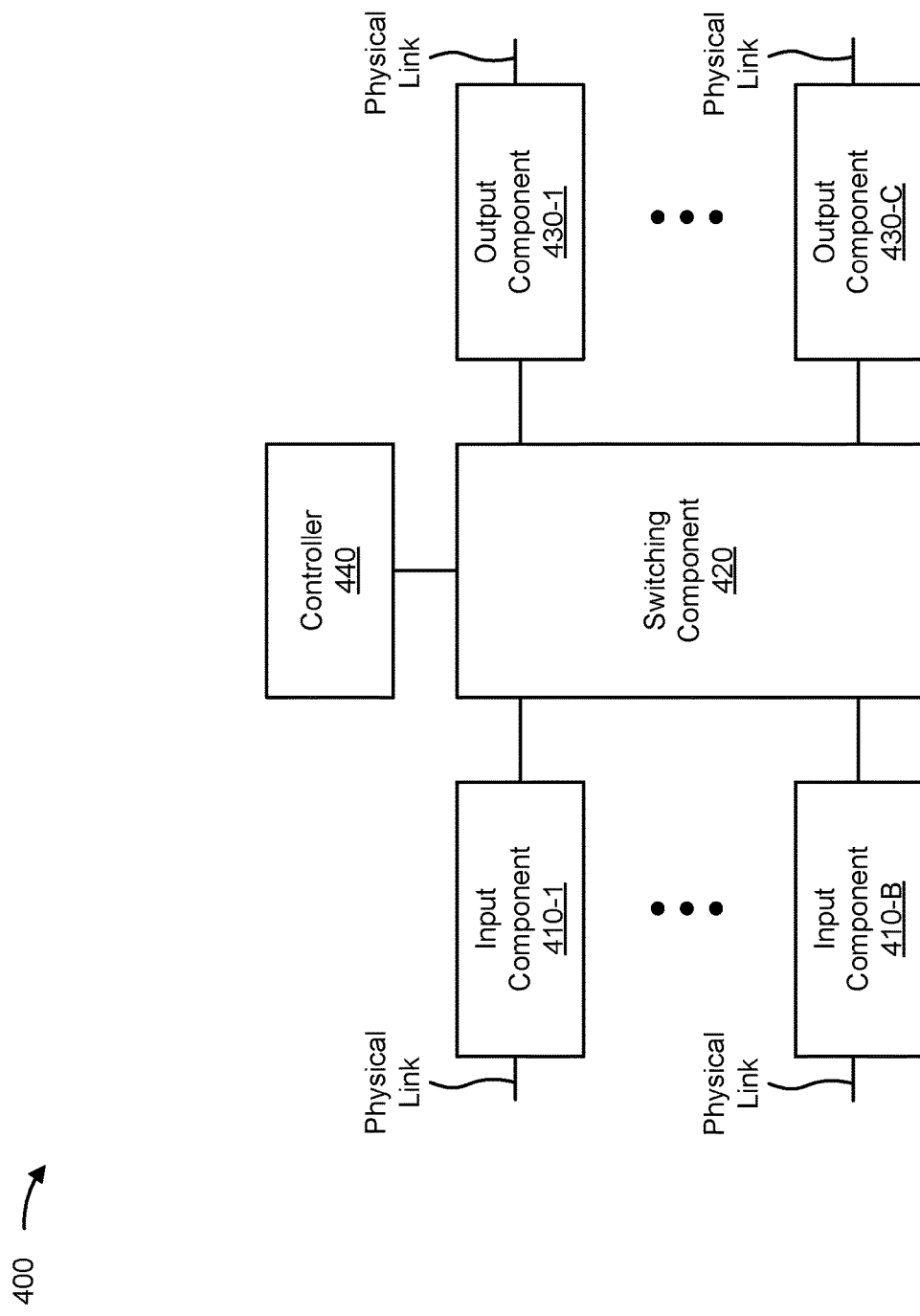
FIG. 4 is a diagram of example components of a device, which may correspond to a network device.

FIG. 4 is a diagram of example components of a device 400. Device 400 may correspond to network device 210. In some implementations, network device 210 may include one or more devices 400 and/or one or more components of device 400. As shown in FIG. 4, device 400 may include one or more input components 410-1 through 410-B (B≥1)

(hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
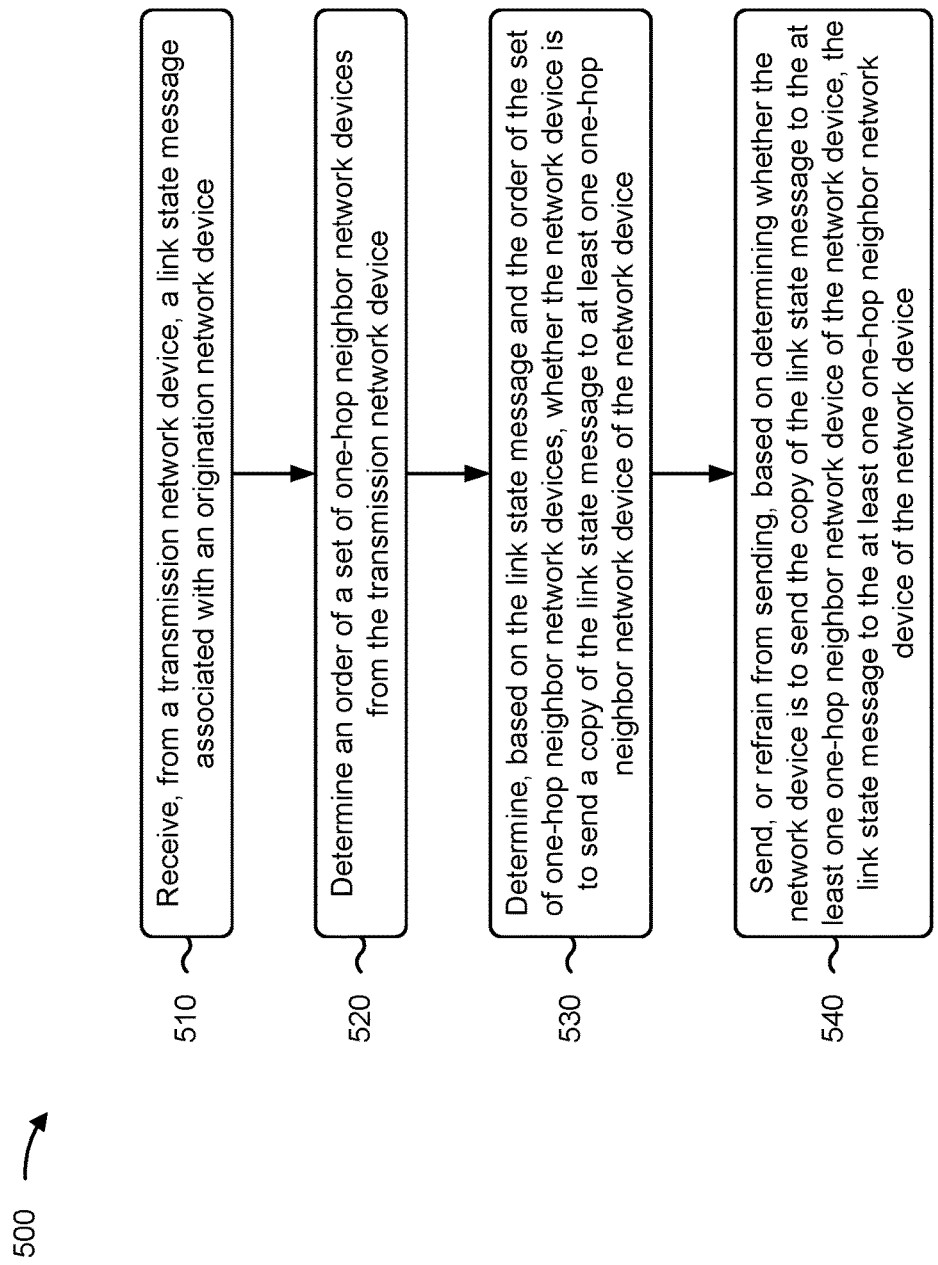
FIG. 5 is a flowchart of an example process associated with a distributed flooding technique.

FIG. 5 is a flowchart of an example process 500 associated with a distributed flooding technique. In some implementations, one or more process blocks of FIG. 5 are performed by a network device (also referred to as a reception network device) (e.g., network device 210). In some implementations, one or more process blocks of FIG. 5 are performed by another device or a group of devices separate from or including the network device, such as one or more other network devices. Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more other components.

As shown in FIG. 5, process 500 may include receiving, from a transmission network device, a link state message associated with an origination network device (block 510). For example, the network device may receive, from a transmission network device, a link state message associated with an origination network device, as described above.

As further shown in FIG. 5, process 500 may include determining an order of a set of one-hop neighbor network devices from the transmission network device (block 520). For example, the network device may determine an order of a set of one-hop neighbor network devices from the transmission network device, as described above.

As further shown in FIG. 5, process 500 may include determining, based on the link state message and the order of the set of one-hop neighbor network devices, whether the network device is to send a copy of the link state message to at least one one-hop neighbor network device of the network device (block 530). For example, the network device may determine, based on the link state message and the order of the set of one-hop neighbor network devices, whether the network device is to send a copy of the link state message to at least one one-hop neighbor network device of the network device, as described above.

As further shown in FIG. 5, process 500 may include sending, or refraining from sending, by the network device and based on determining whether the network device is to send the copy of the link state message to the at least one one-hop neighbor network device of the network device, the link state message to the at least one one-hop neighbor network device of the network device (block 540). For example, the network device may send, or refrain from sending, by the network device and based on determining whether the network device is to send the copy of the link state message to the at least one one-hop neighbor network device of the network device, the link state message to the at least one one-hop neighbor network device of the network device, as described above.

Process 500 may include additional implementations, such as any single implementation or any combination of implementations described below and/or in connection with one or more other processes described elsewhere herein.

In a first implementation, the set of one-hop neighbor network devices includes one or more network devices that are one hop from the transmission network device and that are not associated with a shortest-path spanning tree (SPT) from the origination network device to the network device.

In a second implementation, alone or in combination with the first implementation, determining the order of the set of one-hop neighbor network devices comprises identifying respective information associated with the set of one-hop neighbor network devices, and determining, based on the respective information associated with the set of one-hop neighbor network devices, the order of the set of one-hop neighbor network devices.

In a third implementation, alone or in combination with one or more of the first and second implementations, determining whether the network device is to send the copy of the link state message to the at least one one-hop neighbor network device of the network device comprises determining, based on the link state message and on the order of the set of one-hop neighbor network devices, a particular position in the order of the set of one-hop neighbor network devices, and determining, based on the particular position in the order of the set of one-hop neighbor network devices, that the network device is to send the copy of the link state message to the at least one one-hop neighbor network device of the network device.

In a fourth implementation, alone or in combination with one or more of the first through third implementations, determining whether the network device is to send the copy of the link state message to the at least one one-hop neighbor network device of the network device comprises identifying, based on the link state message, a set of two-hop neighbor network devices from the transmission network device; determining, based on the link state message and on the order of the set of one-hop neighbor network devices, a particular position in the order of the set of one-hop neighbor network devices; identifying, based on the particular position in the order of the set of one-hop neighbor network devices, one or more other network devices, of the set of one-hop neighbor network devices, that are positioned before the network device in the order of the set of one-hop neighbor network devices; updating the set of two-hop neighbor network devices by removing one or more network devices that are one-hop neighbor network devices of the one or more other network devices of the set of one-hop neighbor network devices from the set of two-hop neighbor network devices; determining, after updating the set of two-hop neighbor network devices, that the set of two-hop neighbor network devices is empty; and determining, based on determining that the set of two-hop neighbor network devices is empty, that the network device is to not send the copy of the link state message to the at least one one-hop neighbor network device of the network device.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, message, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    determining, by a network device, whether the network device is to send a copy of a link state message to at least one one-hop neighbor network device; and
    selectively sending, by the network device and based on determining whether the network device is to send the copy of the link state message to the at least one one-hop neighbor network device of the network device, the link state message to the at least one one-hop neighbor network device of the network device.

2. The method of claim 1, wherein determining whether the network device is to send the copy of the link state message to the at least one one-hop neighbor network device of the network device comprises:
    determining whether the network device is to send the copy of the link state message to the at least one one-hop neighbor network device of the network device based on an order of a set of one-hop neighbor network devices.

3. The method of claim 1, wherein determining whether the network device is to send the copy of the link state message to the at least one one-hop neighbor network device of the network device comprises:
    determining whether the network device is to send the copy of the link state message to the at least one one-hop neighbor network device of the network device based on the link state message associated with an origination network device.

4. The method of claim 1, wherein the link state message is associated with an origination network device and received from a transmission network device; and
    wherein the at least one one-hop neighbor network device includes another network device that is one hop from the transmission network device and that is not associated with a shortest-path spanning tree (SPT) from the origination network device to the network device.

5. The method of claim 1, further comprising:
    determining a shortest-path spanning tree (SPT) from an origination network device to the network device;
    determining a set of two-hop neighbor network devices from a transmission network device; and
    updating, based on the SPT, the set of two-hop neighbor network devices.

6. The method of claim 1, further comprising:
    determining a set of one-hop neighbor network devices;
    identifying respective identifiers of the set of one-hop neighbor network devices; and
    determining, based on the respective identifiers of the set of one-hop neighbor network devices, an order of the set of one-hop neighbor network devices.

7. The method of claim 1, further comprising:
    determining an order of a set of one-hop neighbor network devices;
    determining, based on the link state message, a set of two-hop neighbor network devices, and the order of the set of one-hop neighbor network devices,
    wherein determining whether the network device is to send the copy of the link state message to the at least one one-hop neighbor network device of the network device comprises:
        determining, based on the link state message and on the order of the set of one-hop neighbor network devices, a particular position in the order of the set of one-hop neighbor network devices;
        determining that the particular position in the order of the set of one-hop neighbor network devices is associated with the network device; and
        determining, based on determining that the particular position in the order of the set of one-hop neighbor network devices is associated with the network device, that the network device is to send the copy of the link state message to the at least one one-hop neighbor network device of the network device.

8. A non-transitory computer-readable medium storing a set of instructions, the set of instructions comprising:
    one or more instructions that, when executed by one or more processors of a network device, cause the network device to:
        receive a link state message;
        determine, based on the link state message, whether the network device is to send a copy of the link state message to at least one one-hop neighbor network device of the network device; and
        selectively send, or refrain from sending, by the network device and based on determining whether the network device is to send the copy of the link state message to the at least one one-hop neighbor network device of the network device, the link state message to the at least one one-hop neighbor network device of the network device.

9. The non-transitory computer-readable medium of claim 8, wherein the one or more instructions further cause the network device to:
    determine a shortest-path spanning tree (SPT) from an origination network device to the network device;
    determine a set of two-hop neighbor network devices from a transmission network device; and
    update, based on the SPT, the set of two-hop neighbor network devices.

10. The non-transitory computer-readable medium of claim 8, wherein the one or more instructions, that cause the network device to determine whether the network device is to send the copy of the link state message to at least one one-hop neighbor network device of the network device, cause the network device to:
    determine to not send the copy of the link state message because another network device, of the at least one one-hop neighbor network device, is connected to all network devices that were included in a set of two-hop neighbor network devices and is capable of reflooding the link state message to those network devices.

11. The non-transitory computer-readable medium of claim 8, wherein the one or more instructions, further cause the network device to:
    determine an order of a set of one-hop neighbor network devices;
    determine, based on the link state message, the set of two-hop neighbor network devices, and the order of the set of one-hop neighbor network devices, wherein the one or more instructions, that cause the network device to determine whether the network device is to send the copy of the link state message to the at least one one-hop neighbor network device of the network device, cause the network device to:
- determine, based on the link state message and on the order of the set of one-hop neighbor network devices, a particular position in the order of the set of one-hop neighbor network devices;
- determine that the particular position in the order of the set of one-hop neighbor network devices is associated with the network device; and
- determine, based on determining that the particular position in the order of the set of one-hop neighbor network devices is associated with the network device, that the network device is to send the copy of the link state message to the at least one one-hop neighbor network device of the network device.

12. The non-transitory computer-readable medium of claim 8, wherein the one or more instructions, further cause the network device to:
- determine a set of one-hop neighbor network devices;
- identify respective identifiers of the set of one-hop neighbor network devices; and
- determine, based on the respective identifiers of the set of one-hop neighbor network devices, an order of the set of one-hop neighbor network devices.

13. The non-transitory computer-readable medium of claim 8, wherein the one or more instructions further cause the network device to:
- determine that the network device is to send the copy of the link state message to the at least one one-hop neighbor network device of the network device when a set of two-hop neighbor network devices is not empty.

14. The non-transitory computer-readable medium of claim 8, wherein the one or more instructions further cause the network device to:
- receive, from a transmission network device, the link state message associated with an origination network device.

15. A network device, comprising:
one or more memories; and
one or more processors to:
- receive, from a transmission network device, a link state message associated with an origination network device; and
- send, based on determining whether the network device is to send a copy of the link state message to at least one one-hop neighbor network device of the network device, the link state message to the at least one one-hop neighbor network device of the network device.

16. The network device of claim 15, wherein the one or more processors are further to:
- determine a shortest-path spanning tree (SPT) from the origination network device to the network device;
- determine a set of two-hop neighbor network devices from a transmission network device; and
- update, based on the SPT, the set of two-hop neighbor network devices.

17. The network device of claim 15, wherein the network device, the transmission network device, and the origination network device are part of a spine-and-leaf topology.

18. The network device of claim 15, wherein the at least one one-hop neighbor network device includes one or more network devices that are one hop from the transmission network device and that are not associated with a shortest-path spanning tree (SPT) from an origination network device to the network device.

19. The network device of claim 15, wherein the one or more processors to receive the link state message associated with the origination network device, are to:
- receive the link state message that reflooded the link state message.

20. The network device of claim 15, wherein the one or more processors are further to:
- determine a shortest-path spanning tree (SPT) from the origination network device to the network device, and
- update a set of two-hop neighbor network devices and the at least one one-hop neighbor network device to not include network devices included in the SPT.

* * * * *